United States Patent [19]

Goldstein

[11] Patent Number: 5,395,086
[45] Date of Patent: Mar. 7, 1995

[54] TRIPOD STAND FOR ELEVATION OF CAN BOTTOMS

[76] Inventor: Eric Goldstein, 1983 J Powers Ferry Rd., Marietta, Ga. 30067

[21] Appl. No.: 102,418
[22] Filed: Aug. 5, 1993
[51] Int. Cl.⁶ .............................................. A47G 29/00
[52] U.S. Cl. ................................. 248/346; 248/146; 248/176
[58] Field of Search ...................... 248/346, 346.1, 146, 248/163.1, 162.2, 176, 127, 188.1, 310, 903

[56] References Cited

U.S. PATENT DOCUMENTS

| | | |
|---|---|---|
| 551,547 | 12/1895 | Howard . |
| 842,703 | 1/1907 | Roberts .................. 248/163.1 X |
| 902,511 | 10/1908 | Voska et al. . |
| 980,852 | 1/1911 | Van Court . |
| 1,730,698 | 10/1929 | Wagner, Jr. . |
| 1,864,200 | 6/1932 | Kaufmann . |
| 1,925,241 | 9/1933 | Fullerton ................... 65/53 |
| 2,665,872 | 1/1954 | De Witt .................. 248/346 X |
| 2,683,579 | 7/1954 | Wallace .................. 248/146 |
| 2,982,040 | 5/1961 | Keller . |
| 3,298,646 | 1/1967 | Van Buren, Jr. ........... 248/903 X |
| 3,934,806 | 1/1976 | Rady .................... 248/188.1 X |
| 3,940,100 | 2/1976 | Haug .................... 248/188.1 |
| 4,038,914 | 8/1977 | Crespo et al. ............. 248/346 X |
| 4,040,549 | 8/1977 | Sadler ................... 224/290 |
| 4,089,498 | 5/1978 | Woodcuff ................ 248/346.1 |
| 4,254,927 | 3/1981 | Stonhaus ................ 248/903 X |
| 4,361,607 | 11/1982 | Davis et al. .............. 428/354 |
| 4,832,295 | 5/1989 | Wagner ................. 248/346 X |
| 4,858,872 | 8/1989 | Witt .................... 248/346.1 |
| 4,919,381 | 4/1990 | Buist ................... 248/154 |
| 4,988,401 | 1/1991 | Rebreyend . |
| 5,121,897 | 6/1992 | Sofy ................... 248/903 X |
| 5,123,558 | 6/1992 | Moloney ................. 220/212 |
| 5,199,676 | 4/1993 | Kowalewski ............. 248/146 |

FOREIGN PATENT DOCUMENTS 0082661 10/1953 Norway ................. 248/346

Primary Examiner—Ramon O. Ramirez
Attorney, Agent, or Firm—Cesarano & Kain

[57] ABSTRACT

The tripod stand is used to elevate the bottom of a can. Three legs protrude outward from a support platform intersection. The intersection is located below the can bottom. The legs in the intersection establish and lie within a singular support plane beneath the can. Each leg has a foot formed at its remote end. The foot is a compact structure having a lower body protruding below the support plane and having a raised lip protruding above the support plane. The raised lip has a substantially vertical face with an inwardly directed tab near its uppermost periphery. Upon placement of the can bottom on the support plane, the tab locks over the edge of the can bottom. In one embodiment, each foot is generally spherically shaped and the lip is formed as a cut-out from the sphere. In another embodiment, each foot forms a tiered structure defining multiple levels of support surfaces for predetermined can bottom diameters.

14 Claims, 2 Drawing Sheets

TRIPOD STAND FOR ELEVATION OF CAN BOTTOMS

The present invention relates to a tripod stand which elevates the bottom of cans such as aerosol cans, shaving cream cans, and others, in order to prevent or reduce the incidence of corrosion thereat.

BACKGROUND OF THE INVENTION

U.S. Pat. No. 902,511 to Voska et al discloses an ashtray stand having spherical balls which clip-on the lower rim of an ashtray. The clip-on balls are attached at the top of the stand (particularly at the top of the stand legs) and the ashtray is elevated above floor level. U.S. Pat. No. 980,852 to Van Court discloses resilient fingers that clip-on the lower rim of the ashtray or can or cup. U.S. Pat. No. 551,547 to Howard discloses clip-on fingers. U.S. Pat. No. 4,919,381 to Buist discloses a semicircular lip that clips onto the bottom rim of a cup.

OBJECTS OF THE INVENTION

It is an object of the present invention to provide a short, tripod stand to elevate the bottom of a can.

It is another object of the present invention to provide a short stand such that the bottom of the can or container does not corrode.

It is another object of the present invention to provide a foreshortened stand that eliminates stain caused by rusted cans in bathrooms and in other humid environments.

It is a further object of the present invention to provide a stand that can be used for a number of cans having different diameters.

SUMMARY OF THE INVENTION

The tripod stand is used to elevate the bottom of a can. Three legs protrude outward from a support platform intersection. The intersection is located below the can bottom. The legs in the intersection establish and lie within a singular support plane beneath the can. Each leg has a foot formed at its remote end. The foot is a compact structure having a lower body protruding below the support plane and having a raised lip protruding above the support plane. The raised lip has a substantially vertical face with an inwardly directed tab near its uppermost periphery. Upon placement of the can bottom on the support plane, the tab locks over the edge of the can bottom. In one embodiment, each foot is generally spherically shaped and the lip is formed as a cut-out from the sphere. In another embodiment, each foot forms a tiered structure defining multiple levels of support surfaces for predetermined can bottom diameters.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a snap-on tripod stand which elevates the bottom of a can.

Figure 1:
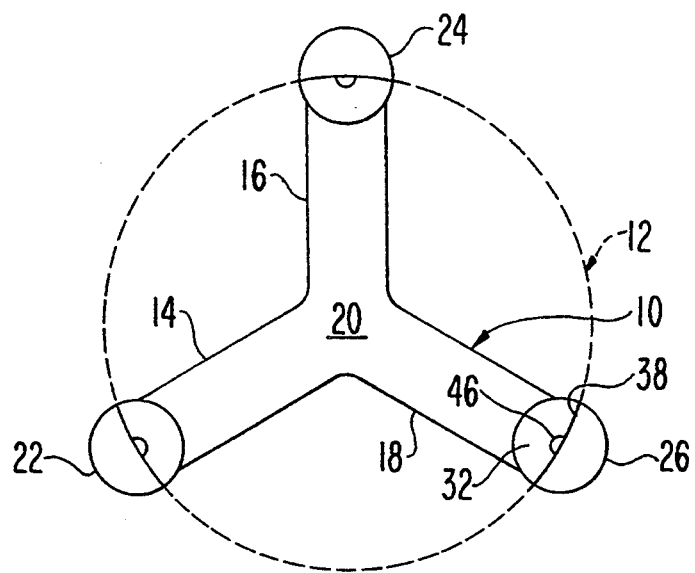
FIG. 1 illustrates a top view of one embodiment of the tripod with the outer periphery of the can bottom shown in phantom lines.
Figure 2:
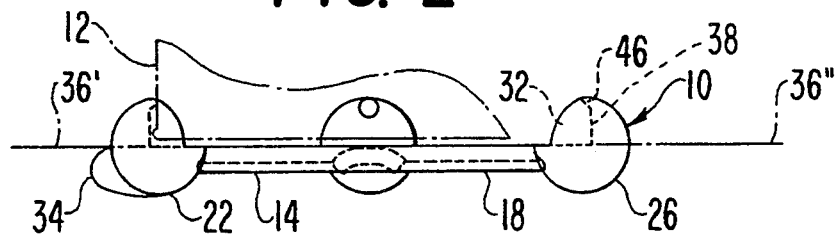
FIG. 2 illustrates a side view of the tripod with the can shown in phantom lines.
Figure 3:
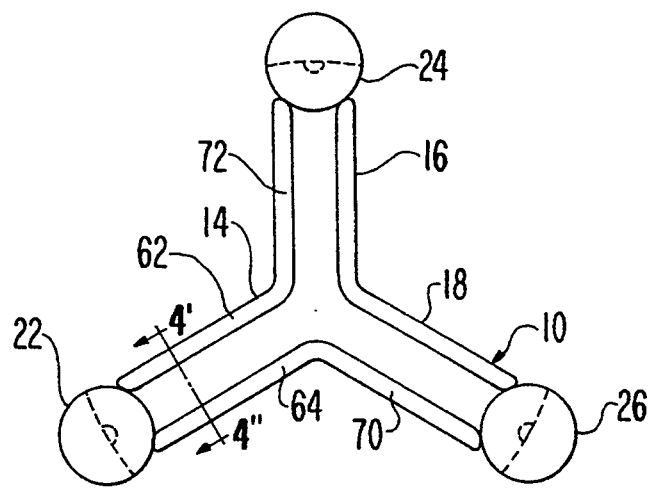
FIG. 3 illustrates a bottom view of the tripod stand.

FIG. 1 illustrates a top view of tripod 10 showing can bottom 12 in phantom lines. FIG. 2 is a side view of tripod 10 and FIG. 3 illustrates a bottom view of tripod 10. FIGS. 1, 2 and 3 are discussed concurrently herein.

Tripod 10 includes three legs 14, 16 and 18 projecting away from support platform intersection 20. At the remote end of each leg, that is remote from intersection 20, each leg includes a foot. Leg 14 includes foot 22, leg 16 terminates in foot 24, and leg 18 carries foot 26. As shown in FIGS. 1-3, feet 22, 24 and 26 are generally spherically shaped except for cut-outs, such as cut-out 32 numerically identified on foot 26 in FIG. 2.

Specifically, each foot has a compact lower body region, such as region 34 identified with respect to foot 22 in FIG. 2. This lower body region protrudes below the support plane which is identified as plane 36'—36" in FIG. 2. Essentially, the support plane is the planar region of the tripod which supports the bottom of the can. Each foot also includes a raised lip, such as lip 38 identified with respect to foot 26 in FIGS. 1 and 2. This substantially vertical face is normal to support plane 36'—36" and coacts with the bottom of the can when the can is placed on the support plane. In addition, the vertical face of each lip rises above support plane 36'—36" as well as the can bottom. In order to sufficiently grip the can, each vertical face includes an inwardly disposed tab, for example tab 46 identified in conjunction with foot 26 in FIGS. 1 and 2. These tabs provide removable locking mechanisms for the legs such that the tripod can be removably attached to the bottom of the can. The tripod may use an interference fit.

Consumers usually recognize that can bottoms, such as can bottom 12 in FIG. 2, include small lips along their lower periphery. These can bottom lips can additionally coact with the inwardly protruding tabs thereby essentially locking the tripod onto the bottom of the can.

In a preferred embodiment, legs 14, 16, and 18 project from intersection 20 and form a balanced support structure for the bottom of the can. This balanced support structure is formed by the equilateral support and the equidistant spacing of the feet as well as the projecting leg portions.

FIGS. 1-6 illustrate feet having a generally spherical shape. One important feature of the present invention is the hemispherical shape of the lower body portion of each foot. See body portion 34 of foot 22 in FIG. 2. The hemispherical shape provides a compact, well balanced support structure for each leg, and further provides a durable and flexible terminal end for each leg. An enhancement to the foot in shown in FIG. 6 wherein foot 52 includes a foot cap 54. Foot cap 54 has a surface 56 which has a high coefficient of friction. In other words, foot cap 54 could be made of rubber or other compressible material having a high coefficient of friction on its surface. In contrast, the tripod 10 itself is preferably made of some type of resilient plastic having a relatively low coefficient of friction.

Another feature of the present invention is that the lower body portion (portion 34 of foot 22) of each foot does not protrude below support plane 36'—36" a distance exceeding three times the depth or the thickness of the leg. This dimensional relationship is important in order to enhance the stability of the tripod.

Figure 4:
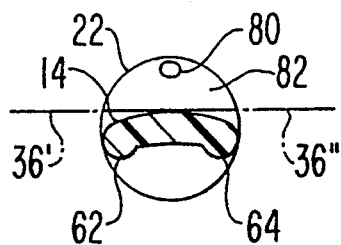
FIG. 4 illustrates a cross-sectional view of one leg and one foot from the perspective of section line 4'—4" in FIG. 3.
Figure 7:
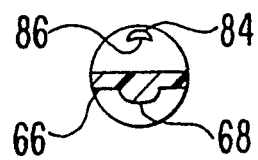
FIG. 7 illustrates a cross-sectional view of a leg incorporating a singular support beam.

Legs 14, 16, and 18 should be somewhat resilient in order to permit the user to flex the tripod and remove it from the can bottoms. In order to provide structural support to the generally rectangularly shaped cross-section of the leg, each leg may include an integral support beam. In FIG. 4, leg 14 includes a pair of peripheral support beams 62, 64. Each support beam extends below support plane 36'—36". In FIG. 7, leg 66 includes a singular integral support beam 68. Referring now to the pair of peripheral support beams 62, 64, FIG. 3 shows that support beam 54 is joined to adjacent support beam 70 associated with leg 18. Also, support beam 72 for leg 16 is joined with support beam 62. This joinder of adjacent support beams provides a very stable structure and yet permits the legs be bent by the user to attach and remove the tripod from the bottom of a can. If a singular support beam is used, adjacent support beams would not be joined and, in fact, each beam would be free standing and be spaced away from intersection 20. Again, the spacing away of the singular support beam (shown in FIG. 7) permits the user to flex the legs and attach and remove the tripod from the bottom of a can.

Figure 5:
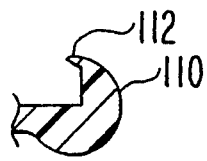
FIG. 5 illustrates a cross-sectional view of a foot showing a different type of tab.
Figure 6:
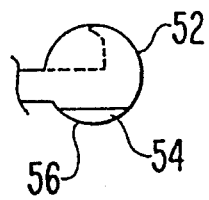
FIG. 6 illustrates a foot having a foot cap thereon.

FIGS. 4, 5 and 7 also illustrate various types of inwardly directed tabs. FIG. 4 shows tab 80 as being generally round and protruding from face 82 of foot 22. In FIG. 7, tab 84 has a truncated bottom surface or lower ledge 86 which may enhance the gripping capability of the tab. In FIG. 5, foot 110 defines a finger tab 112.

Figure 8:
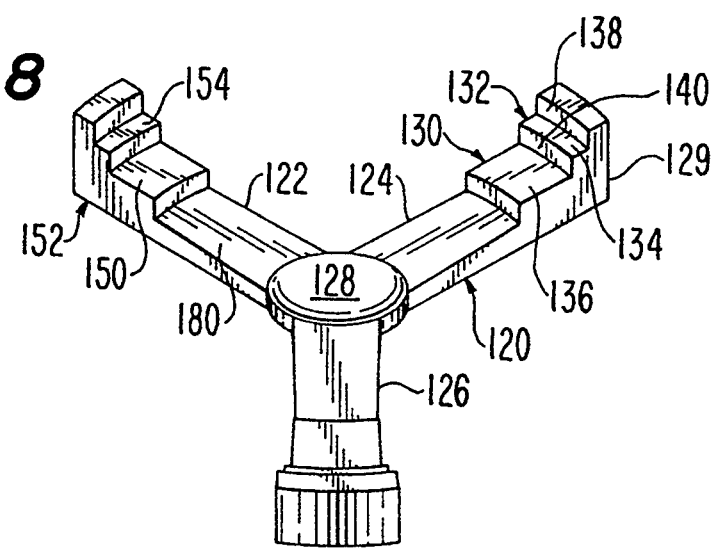
FIG. 8 illustrates a perspective view of a tripod having a tiered foot structure.

FIG. 8 illustrates a perspective view of tripod 120. Tripod 120 includes three legs 122, 124 and 126 projecting from support intersection 128. Each leg has a foot formed at the remote end thereof. As shown with respect to leg 124, foot 129 includes a plurality of tiers or terraces 130 and 132. Each tier includes a distinct support surface 134, 136 and a corresponding vertical face 138, 140. Support surface 136, in combination with support surface 150 on foot 152, provides a support plane for a can bottom having a predetermined diameter. Support surface 134 and surface 154 provide a support plane for a can bottom having a greater predetermined diameter. The adjacent vertical faces are spaced away from intersection 128 such that, in one embodiment, the faces mate with the can bottom in an interference fit. Otherwise, the vertical faces could include tabs, similar to tabs 80, 84, and 112 shown in FIGS. 4, 5 and 7. It should also be noted that snap-on tripod 120 includes a lower support surface defined by the top faces of the legs. Top face 180 formed by leg 122 defines a portion of this lower support surface.

In a preferred embodiment, the tabs are spaced approximately $\frac{1}{8}$" to $\frac{1}{4}$" above the support plane. The tabs protrude inward beyond vertical faces approximately 1/16". The hemispherical diameter of the feet is approximately $\frac{1}{2}$". The width of the legs is approximately $\frac{1}{3}$". The total width of the tripod is approximately 2.5".

The claims appended hereto are meant to cover modifications and changes within the spirit and scope of the present invention.

What is claimed is:

1. A short, snap-on tripod stand to elevate the bottom of a can comprising:
   three legs projecting outward from a support platform intersection, said intersection located below said can bottom during use, said legs and said intersection establishing and lying in a singular support plane beneath said can bottom;
   a foot formed at the remote end of each leg, each foot having a compact lower body portion protruding below said support plane and having a raised lip protruding above said support plane, said raised lip having a substantially vertical face adapted to co-act with said can bottom such that upon placement of said can bottom on said support plane, a respective vertical face of each corresponding lip lies adjacent and rises above said can bottom, each said vertical face including an inwardly protruding gripping element inboardly offset with respect to said vertical face, said gripping element locking said legs onto said can bottom upon placement of said can bottom on said support plane wherein said gripping elements of each leg removably lock said tripod on said can bottom, said legs being made of resilient material to facilitate the removal from said can bottom.

2. A tripod as claimed in claim 1 wherein each lower body portion of each said foot includes a foot cap defining a lower surface foot region with a high coefficient of friction.

3. A tripod as claimed in claim 1 wherein said intersection is located beneath a vertical centerline of said can and said legs are spaced equidistance from each other about said intersection.

4. A tripod as claimed in claim 1 wherein each said foot defines a substantially hemispherical lower body portion.

5. A tripod as claimed in claim 4 wherein said lip is a cut-out of a substantially spherically shaped foot.

6. A tripod as claimed in claim 1 wherein said legs and said intersection lie solely within said support plane and said feet rise above and protrude below said support plane a distance not exceeding three times a depth of said legs.

7. A tripod as claimed in claim 1 wherein each said foot protrudes below said support plane a distance not greater than three time the thickness of said legs.

8. A tripod as claimed in claim 1 wherein a cross-sectional aspect of each said leg defines a shallow, inverted U-shape.

9. A tripod as claimed in claim 1 wherein each said leg includes an integral support beam therein.

10. A tripod as claimed in claim 8 wherein said inverted U-shape of each leg defines a pair of peripheral support beams for each corresponding leg, each support beam of a respective pair joined to an adjacent support beam on an adjacent leg in said support plane.

11. A tripod as claimed in claim 1 wherein said gripping elements are tabs which extend normal to said vertical face and removably lock said tripod on said can bottom.

12. A short, snap-on tripod stand to elevate the bottom of a can comprising:
   three legs projecting outward from a support platform intersection, said intersection located below said can bottom during use, said legs and said intersection establishing and lying in a singular support plane beneath said can bottom;

respective feet formed at the remote end of each leg, each foot defining:

multi-level support surfaces for an edge region of said can bottom, said multi-level support surfaces forming tiers on the inboard side of each said foot;

a lower body portion protruding below said support plane;

each tier having a raised lip protruding above a unique support plane corresponding to a predetermined can bottom diameter, each said lip having a substantially vertical face adapted to co-act with said predetermined can bottom such that upon placement of said can bottom on said unique support plane, a respective vertical face of each corresponding lip lies adjacent and rises above said predetermined can bottom;

wherein said legs are made of resilient material to facilitate the removal of said can bottom; and, wherein the vertical, co-acting face grips said can bottom in an interference fit.

13. A tripod as claimed in claim 12 wherein each said vertical face includes an inwardly protruding tab normal to said vertical face, said tab locking said legs onto said can bottom upon placement of said can bottom on said support plane.

14. A tripod as claimed in claim 13 wherein said vertical faces of each unique tier defining said tab mate with said predetermined can bottom in an interference fit.

* * * * *